Patented July 29, 1947

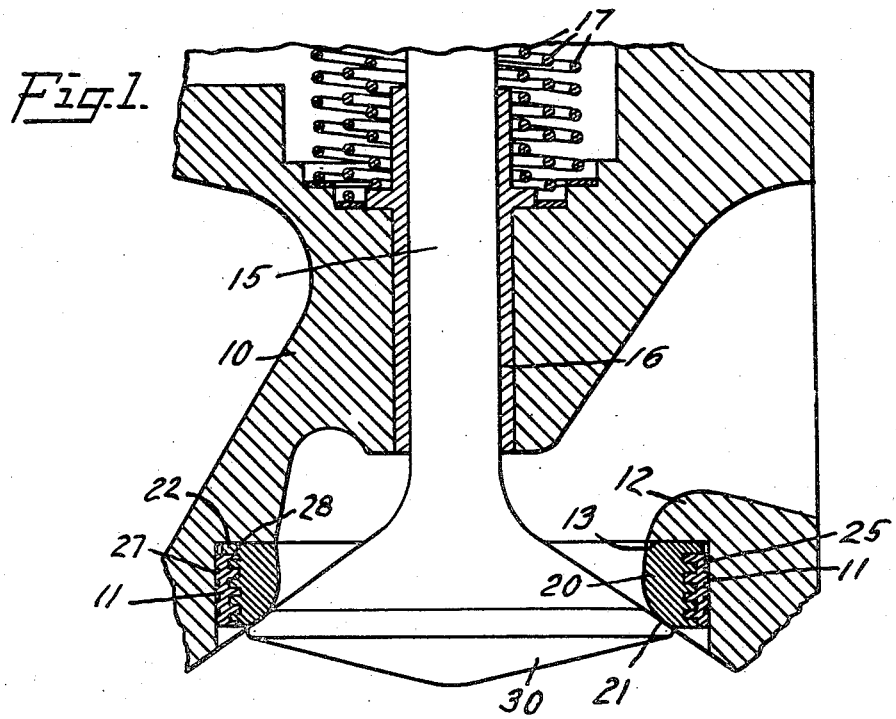
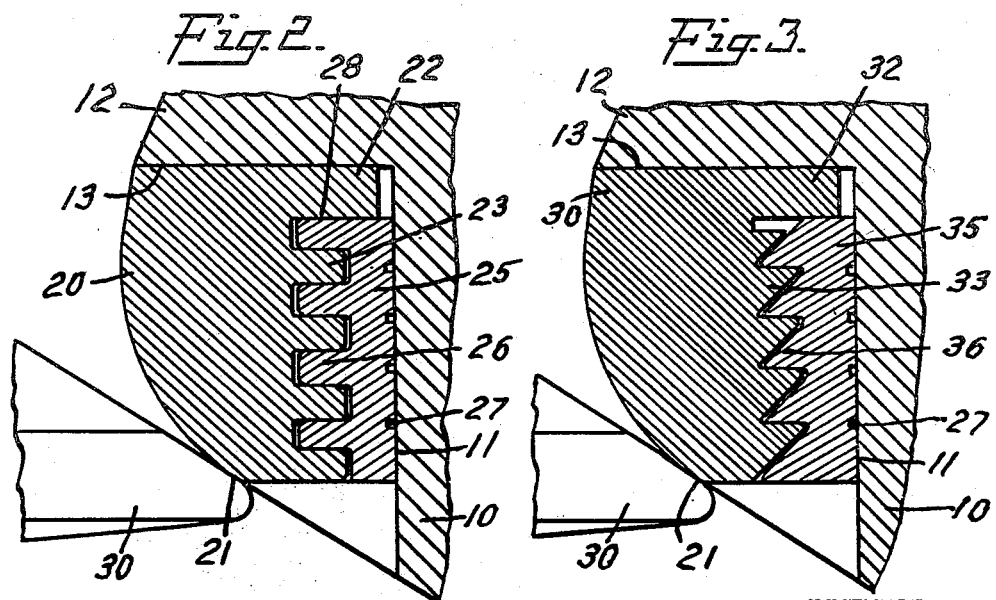

2,424,738

UNITED STATES PATENT OFFICE 2,424,738

VALVE MECHANISM

Wilhelm B. Bronander, Montclair, N. J.

Application July 31, 1945, Serial No. 608,001

3 Claims. (Cl. 123—188)

This invention relates to valve seats for internal combustion engines.

At the present time it is common practice to provide forged aluminum cylinder heads with steel valve seats. To accomplish this the valve seat ring is screwed or threaded into the cylinder head. However, it has been found in practice that it is impossible to prevent leakage through the threaded connection between the ring and the cylinder head and, furthermore, the valve seat ring tends to unscrew from its seat.

This invention has for its salient object to provide an improved valve seat unit so constructed and arranged that the connection between the head and the unit will be tight and, furthermore, so constructed as to permit tightening of the outer ring to a predetermined torque and a limited lateral movement of the inner ring of the valve seat unit, thus insuring the proper seating of the valve head on the valve seat.

Further objects of the invention will appear from the following specification taken in connection with the drawings which form a part of this application, and in which Fig. 1 is a sectional elevation of a portion of a cylinder head having a valve opening and a valve seat unit constructed in accordance with the invention and mounted therein;

Fig. 2 is an enlarged sectional elevation, broken away, and illustrating in section one edge portion of the valve opening and valve seat unit mounted therein; and Fig. 3 is a sectional view similar to Fig. 2 but showing a modified construction embodying the invention.

In the particular embodiment of the invention illustrated in the drawings there is shown a portion 10 of a cylinder head having a valve opening 11, at the inner end of which there is disposed an inwardly extending flange 12 forming a shoulder 13.

The cylinder head has a bore for the valve stem 15 and a valve stem bushing 16 in which the valve stem reciprocates. Suitable valve springs 17 of any desired construction are provided for closing the valve.

The valve seat unit shown in Fig. 2 comprises an inner ring 20 having a valve seat 21 at one end thereof and a laterally extending flange 22 at the other end thereof. The ring 20 is provided with external square threads 23.

The valve seat unit furthermore comprises an outer ring 25 having internal threads 26 conforming in pitch to the pitch of the threads 23. If desired, the ring 25 may be provided with annular grooves 27 to assist in locking the ring 25 in the valve opening 11.

The ring 25 is first threaded onto the threaded ring 20 at a predetermined torque and until the inner surface 28 tightly seats against the outer or under surface of the flange 22. It will be noted that the diameter of the flange 22 is less than the outside diameter of the ring 25. The cylinder and particularly the portion of the head around the port opening 11 is then heated and the valve unit comprising the ring 25 with the ring 20 secured thereto is then shrunk into the valve opening or port 11, attention being called to the fact that the outer surface of the flange 22 is disposed in contact with the under surface or shoulder 13 of the flange 12. Thus the flange 22 is locked between the ring 25 and the shoulder 13 and the inner ring cannot become loose or screw out of the outer ring 25. Furthermore, a limited lateral movement of the inner ring 20 is permitted, thus giving a floating valve seat insuring the proper seating of the valve head 30 on the seat 21. The tight contact between the flange 22 and cylinder head forms an efficient heat conducting contact, thus facilitating the removal of heat from the valve unit. The clamping of the flange 22 or 32 as shown in Figs. 2 and 3 does not prevent limited lateral movement of the valve seat when the engine is hot since the different thicknesses of the interengaging parts causes unequal expansion thereof due to heat. Thus, although the parts are tight when cold, limited movement is permitted when they are hot.

In Fig. 3 the inner ring 30 has a flange 32 that is locked against the shoulder 13 by the outer ring 35. Rings 30 and 35 are threaded together by saw tooth threads 33 and 36.

Although certain specific embodiments of the invention have been particularly shown and described it will be understood that the invention is capable of further modification and that further changes in the arrangement and in the construction of the various cooperating parts may be made without departing from the spirit or scope of the invention, as expressed in the following claims.

What I claim is:

1. In combination, a cylinder head having a port opening and a valve seat unit comprising an inner ring having a valve seat and an outer ring threaded to the inner ring, one ring having a portion engaged by the other ring for locking the inner ring against outward axial movement in the outer ring, said outer ring being shrunk into said port opening.

2. In combination, a cylinder head having a valve seat opening and a valve seat unit comprising an inner ring having a valve seat and having external threads and a flange at one end of the threads extending laterally beyond said threaded portion, and an outer ring threaded on said inner ring and having one end abutting said flange, said valve opening in the head having an inwardly extending flange forming a shoulder at the inner edge of the opening, said outer ring being secured in said opening with the inner ring flange disposed against said shoulder.

3. In combination, a cylinder head having a valve seat opening and a valve seat unit comprising an inner ring having a valve seat and having external threads and a flange at one end of the threads extending laterally beyond said threaded portion, and an outer ring having internal threads threaded on said inner ring and having one end abutting said flange, said valve opening in the head having an inwardly extending flange forming a shoulder at the inner edge of the opening, said outer ring being secured in said opening with the inner ring flange disposed against said shoulder, the threads on the inner and outer rings being so dimensioned that a clearance is provided therebetween to permit limited lateral movement of the inner ring in the outer ring.

WILHELM B. BRONANDER.

REFERENCES CITED

The following references are of record in the file of this patent:

UNITED STATES PATENTS

| Number | Name | Date |
| --- | --- | --- |
| 1,756,337 | Bowler | Apr. 29, 1930 |
| 2,165,311 | Stancliff | July 11, 1939 |

FOREIGN PATENTS

| Number | Country | Date |
| --- | --- | --- |
| 380,608 | England | Sept. 22, 1932 |